May 11, 1926.
N. HARRISON
STORAGE BATTERY
Filed June 19, 1922
1,584,094
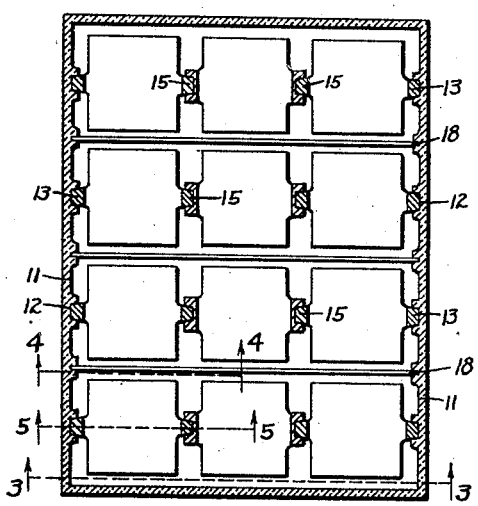
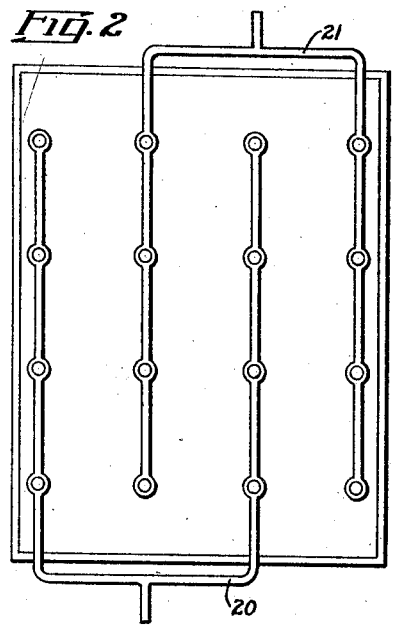
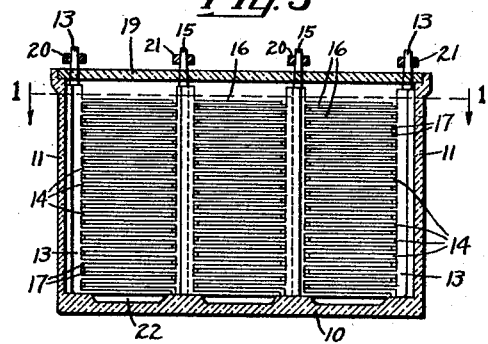
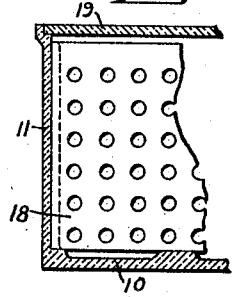
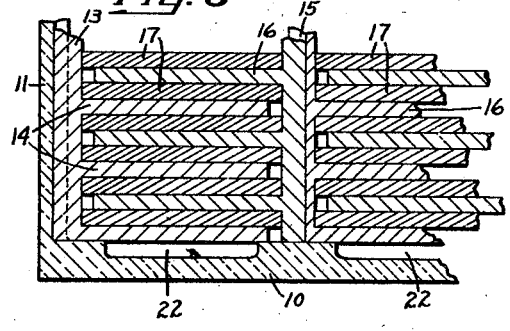
INVENTOR.
Newton Harrison
BY
G. H. Braddock
ATTORNEY.

Patented May 11, 1926.

1,584,094

UNITED STATES PATENT OFFICE.

NEWTON HARRISON, OF MILFORD, CONNECTICUT.

STORAGE BATTERY.

Application filed June 19, 1922. Serial No. 569,490.

This invention relates to a novel and improved storage battery.

An object of the invention is to provide a capable and efficient battery which can be quickly charged to have an unusual capacity and a long life.

A further object is to produce a storage battery having the greatest possible and practicable exposure of active material per unit of weight.

A still further object is to incorporate the active material of a battery in such manner that the same is not only exposed to the electrolyte to maximum extent, but is preserved for service, no portion of the material being liable to become unused or unduly wasted.

An additional and more specific object is to perfect a storage battery for the utilization of thinner and stronger plates than heretofore employed in batteries whereby the full potential capacity of the plates can be effective to quickly store and discharge electrical energy, and to equip the battery with means for rendering the plates effective and durable to perform their intended function. To the accomplishment of this last mentioned object, I utilize a considerable number of plates of area relatively small compared to thickness, and I preferably arrange the plates horizontally in unit positive and negative groups, supplying a single supporting or distributing post for a unit, all as to be made clear.

With the above and other objects in view, the invention comprises the construction, arrangement and combination of parts as now to be fully described and as hereinafter to be specifically claimed, it being understood that the disclosure herein is merely illustrative and meant in no way to limit the spirit of the invention, changes in details of construction and arrangement of parts being permissible so long as within the scope of the appended claims.

In the accompanying drawing forming a part of this specification,

Fig. 1 is a sectional view of the storage battery as on line 1—1 in Fig. 3;

Fig. 2 is a top plan view;

Fig. 3 is a sectional view as on line 3—3 in Fig. 1;

Fig. 4 is a sectional view on line 4—4 in Fig. 1; and

Fig. 5 is an enlarged sectional view on line 5—5 in Fig. 1.

Referring to the drawing by the numerals of reference indicated thereon, 10 denotes the container or jar of the battery which may be of any material suitable for the purpose.

As shown, the opposite side walls, denoted 11, of the container, are provided with vertically extending grooves 12 into which are fitted supporting or distributing posts 13 the lower ends of which rest upon the bottom of the container.

Each supporting or distributing post 13 is provided with spaced apart, relatively thin plates 14, the plates in the instance of each post extending horizontally, toward the center and transversely of the container.

Numeral 15 denotes supporting or distributing posts arranged between the posts 13, respectively, and having thin plates 16 extending in opposite direction therefrom and transversely of the container, there being a plate 16 for each plate 14, and all of the plates 14 and 16 being either in alignment or parallel. The lower ends of the posts 15 likewise rest upon the bottom of the container.

As very clearly disclosed in Figs. 3 and 5, the plates 14 terminate short of the posts 15 and the plates 16 terminate short of the posts 13 and of the posts 15 opposite them, there being separators 17 of porous, absorbent material, not chemically acted upon by the electrolyte adapted to be contained in the jar, between all of the adjacent plates and traversing the distance between the posts 13—15, 15—15, and 15—13, as will be understood.

I have preferred to disclose four rows of posts 13, 15, each partitioned from the other by a perforated separator 18, desirably of insulating material, allowing free passage of the electrolyte from one row of plates to the other, as best shown in Fig. 4.

A container cover 19 has openings allowing for the passage of the posts 13, 15 to the outside of the battery, and, as disclosed, positive and negative connectors 20 and 21 are secured to posts 13, 15 and 15, 13, respectively, in ordinary or preferred manner.

Numeral 22 denotes cut-away portions in the bottom of the container for the obvious purpose of allowing the electrolyte to have contact with the bottom plates and to circulate about the plates.

As will be evident, the supporting or distributing posts 15 are made in two parts which are fitted together for convenience. The arrangement could be different.

The porous separators are preferably in contact with the plates both above and below them, and are capable of freely absorbing the electrolyte to deliver it to the plates.

Obviously, the plates and their separators could be associated in different manner, all that is necessary being to keep the positive and negative plates out of contact with each other, the positive plates being associated with the posts engaging the connector 20 and the negative plates being associated with the posts engaging the connector 21, the separators themselves, being longer than the plates, spacing the posts apart.

It is to be especially noted that each set of positive and negative elements, there being twelve of these sets shown in the cell illustrated, is a localized electrical unit, and is in itself a complete electrical entity composed of positive and negative elements disposed in the electrolyte. That is, this cell is a multiple unit cell composed of a plurality of complete electrical entities. The capacity of the cell, therefore, is the capacity of one of these units multiplied by the number of units in the cell. The voltage of the cell is that of a single unit.

By the construction disclosed and the arrangement of the plates carrying the active material in localized units, the plates may be made small and thin without reducing their mechanical strength below that required by good engineering practice, and a given weight of active material may be exposed to the electrolyte to the maximum degree. This means that the total charging and discharging current for the cell may be greatly increased over that of the ordinary cell without increasing the current flow per unit of area of the surface of active material exposed to the electrolyte. This is because of the greatly increased surface of a given weight of active material exposed to the electrolyte in this construction. Thus without increasing the current density per unit of area of the active material exposed to the electrolyte above that now considered good practice, it is possible in this multiple unit cell to greatly reduce the time required for charging and discharging over that required for the ordinary cell.

It will be apparent that by the arrangement as described, the plates of the storage battery can be as thin as may be desired to have surfaces exposed to the electrolyte to maximum extent, the exposed surface being the active material of the battery. At the same time, the plates can be, and preferably are, of relatively small area, so that a high charge or discharge will not injure or warp the plates, the structure as illustrated and described provided for simplicity in manufacturing and assembling the battery and for durability of the plates in the use of the same.

By reason of the horizontal arrangement of the plates and their interrelation with the posts and porous separators, no portion of the active material of a plate is liable to become unfit for actual service.

It may be well to remark that the plates are preferably integral with the supporting or distributing posts.

Having thus fully described the invention, what I claim as new and desire to secure by Letters Patent is:

1. A multiple unit storage battery cell comprising a plurality of localized electrical units in a common electrolyte, each unit comprising one or more positive electrodes and one or more negative electrodes arranged in superimposed relation, and means for electrically connecting said units.

2. A storage battery cell comprising a plurality of localized electrical units in a common electrolyte, each unit having one or more positive electrodes and one or more negative electrodes arranged in superimposed relation, means for electrically connecting the positive electrodes of the cell to a common conductor, and means for electrically connecting the negative electrodes of the cell to a common conductor.

3. A storage battery comprising a plurality of multiple unit cells, each cell comprising a plurality of groups of substantially horizontally arranged, interleaved positive and negative electrodes in a common electrolyte, conducting means electrically connecting the positive electrodes of each group, conducting means electrically connecting the negative electrodes of each group, and porous separators between the electrodes of opposite polarity.

4. A unit for a multiple unit storage cell comprising a plurality of sets of small thin plates arranged in superimposed spaced relation and carrying active material, the plates of one of the sets forming positive elements and the plates of another set forming negative elements, the plates of a positive set being interleaved with the plates of a negative set, and conductors connecting the plates of each set.

5. A storage battery cell having an electrolyte, means providing positive and negative elements in said electrolyte, the positive and negative elements being each composed of a large number of connected, superimposed small thin plates carrying active material whereby a given weight of said active material is extensively subdivided and has a maximum of surface exposed to the electrolyte, means for connecting the positive elements, and means for connecting the negative elements, the plates of a positive element being interleaved with the plates of a negative element.

6. A storage battery cell comprising a plurality of units, each unit comprising a plurality of substantially horizontally arranged positive electrodes and a plurality of substantially horizontally arranged negative electrodes interleaved with the positive electrodes, upright conductors connecting the positive electrodes of each unit, upright conductors connecting the negative electrodes of each unit, conducting means connecting the upright positive conductors of the cell, and conducting means connecting the upright negative conductors of the cell.

7. A storage battery cell comprising a plurality of electrical units in a common electrolyte, each unit being a complete electrical entity consisting of a plurality of electrically connected positive plates and a plurality of electrically connected negative plates interleaved with the positive plates, and said plates being substantially horizontally arranged in superimposed relation.

8. A storage battery cell comprising a plurality of electrical units in a common electrolyte, each unit being a complete electrical entity comprising a plurality of substantially horizontally arranged positive and negative plates spaced from and interleaved with each other, and upright posts connecting the positive and negative plates respectively.

9. A storage battery cell comprising a plurality of electrical units in a common electrolyte, each unit being a complete electrical entity comprising a plurality of spaced positive and negative plates alternately arranged one above the other, porous spacing elements between the respective plates, and upright conducting posts connected to the positive and negative plates respectively.

10. A storage battery cell comprising a plurality of electrical units in a common electrolyte, each unit being a complete electrical entity consisting of a plurality of superimposed and interleaved positive and negative electrodes, conducting means for connecting all of the positive and negative electrodes respectively together in a unit, and conducting means for connecting all of the said positive and negative conducting means respectively together in the cell.

11. A storage battery comprising a plurality of electrically connected cells, each cell comprising a plurality of localized electrical units in a common electrolyte, each unit having a plurality of substantially horizontally arranged positive electrodes and a plurality of substantially horizontally arranged negative electrodes interleaved with the positive electrodes, means for electrically connecting the positive electrodes of each cell, and means for electrically connecting the negative electrodes of each cell.

12. A storage batttery cell comprising a plurality of localized electrical units in a common electrolyte, each unit comprising a plurality of spaced, electrically connected, substantially horizontally arranged positive plates, a plurality of spaced, electrically connected, substantially horizontally arranged negative plates interleaved with the positive plates, and porous spacing elements between the respective plates.

13. A storage battery comprising a plurality of cells, each cell comprising a plurality of localized electrical units in a common electrolyte, each unit of a cell comprising a plurality of spaced, substantially horizontally arranged positive plates, a plurality of spaced, substantially horizontally arranged negative plates interleaved with the positive plates, porous spacing elements between the positive and negative plates, an upright conductor connected to the positive plates of each unit, an upright conductor connected to the negative plates of each unit, and means for electrically connecting the conductors.

14. A storage battery cell comprising a plurality of distinct electrical units in a common electrolyte, each unit consisting of a plurality of electrically connected positive metal plates, a plurality of electrically connected negative metal plates, said plates being provided with transverse openings extending therethrough and arranged with the positive plates interleaved with the negative plates, active material filling said openings so as to be exposed to the electrolyte on opposite sides of the plates, and porous separators between the plates of opposite polarity.

15. A storage battery cell comprising a plurality of distinct electrical units in a common electrolyte, each unit being a complete electrical entity consisting of a plurality of electrically connected positive plates, a plurality of electrically connected negative plates, said plates being arranged with the positive plates interleaved with the negative plates and one above the other, and porous separators between the plates of opposite polarity, an upright post of one unit being provided with a longitudinal groove arranged to receive an upright post of an adjacent unit.

16. A storage battery cell comprising a plurality of distinct electrical units in a common electrolyte, each unit consisting of a plurality of electrically connected positive plates, a plurality of electrically connected negative plates, said plates being provided with transverse openings extending therethrough filled with active material and arranged in superimposed relation with the positive plates interleaved with the negative plates, and porous separators between the plates of opposite polarity.

17. A storage battery cell comprising a plurality of electrical units in a common electrolyte, each unit being a complete electrical entity comprising a plurality of substantially horizontally arranged spaced positive and negative elements, porous spacing members between said elements, and upright conducting posts connecting the positive and negative elements respectively.

18. A storage battery cell comprising a plurality of electrical units in a common electrolyte, each unit being a complete electrical entity consisting of positive and negative plates, and perforated separators between respective units.

19. A storage battery cell comprising a plurality of electrical units in a common electrolyte, each unit being a complete electrical entity comprising a plurality of spaced substantially horizontally arranged positive and negative plates alternately arranged, porous spacing elements between the respective plates, and upright conducting posts connected to the positive and negative plates respectively.

20. A storage battery cell comprising a plurality of sets of positive and negative elements in a common electrolyte, each set comprising a plurality of superimposed electrically conductive supports connected together and active material carried by said supports.

21. A storage battery cell having an electrolyte, means providing positive and negative elements in said electrolyte composed of a large number of small thin electrically conductive plates arranged in groups in the common electrolyte, the plates of each group being arranged in superimposed relation and carrying active material whereby a given weight of said active material is extensively subdivided and has a maximum of surface exposed to the electrolyte, means for connecting the positive elements, and means for connecting the negative elements.

22. A storage battery cell comprising a plurality of units in a common electrolyte, each unit comprising a plurality of substantially horizontally arranged positive electrodes and a plurality of substantially horizontally arranged negative electrodes in superimposed relation, upright conductors connecting the positive electrodes of each unit, upright conductors connecting the negative electrodes of each unit, conducting means connecting the upright positive conductors of the cell and conducting means connecting the upright negative conductors of the cell.

Signed at Bridgeport, in the county of Fairfield, and State of Connecticut, this 17th day of June, A. D. 1922.

NEWTON HARRISON.